United States Patent
Tsien et al.

(10) Patent No.: US 11,734,151 B2
(45) Date of Patent: Aug. 22, 2023

(54) PRECISE SHADOWING AND ADJUSTMENT OF ON-DIE TIMERS IN LOW POWER STATES

(71) Applicant: Advanced Micro Devices, Inc., Santa Clara, CA (US)

(72) Inventors: Benjamin Tsien, Fremont, CA (US); Pravesh Gupta, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 5 days.

(21) Appl. No.: 17/357,200

(22) Filed: Jun. 24, 2021

(65) Prior Publication Data

US 2022/0413984 A1    Dec. 29, 2022

(51) Int. Cl.
*G06F 11/34*    (2006.01)

(52) U.S. Cl.
CPC ........ *G06F 11/349* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 5,729,722 A | 3/1998 | Matsumoto | |
| 5,987,614 A * | 11/1999 | Mitchell | G06F 1/3259 710/16 |
| 8,624,627 B1 * | 1/2014 | Jarrar | G06F 1/3228 326/62 |
| 10,732,698 B2 | 8/2020 | Pineda de Gyvez et al. | |
| 10,886,919 B1 | 1/2021 | Myers et al. | |
| 2011/0161706 A1 | 6/2011 | Huang et al. | |
| 2016/0380769 A1 * | 12/2016 | Bar | G06F 21/50 713/193 |

FOREIGN PATENT DOCUMENTS

CN        105703749 A    6/2016

OTHER PUBLICATIONS

International Search Report and Written Opinion for International Application No. PCT/US2022/032658, dated Sep. 21, 2022, 7 pages.

* cited by examiner

*Primary Examiner* — Farley Abad
*Assistant Examiner* — Dayton Lewis-Taylor
(74) *Attorney, Agent, or Firm* — Polansky & Associates, P.L.L.C.; Paul J. Polansky; Nathan H. Calvert

(57) ABSTRACT

An integrated circuit (IC) includes a first circuit including a timer for receiving an adjustable clock signal. Responsive to leaving the non-operational power state to enter a power state in which the adjustable clock has a lower frequency than the reference clock, the first circuit adjusts the frequency of the adjustable clock to a frequency higher than the lower frequency, and then receives an elapsed time associated with the non-operational power state and starts the timer using an adjusted timer value.

20 Claims, 5 Drawing Sheets

PRECISE SHADOWING AND ADJUSTMENT OF ON-DIE TIMERS IN LOW POWER STATES

BACKGROUND

Computer systems utilize a variety of peripheral components for different input/output and communication functions. A system-on-chip (SOC) combines data processing circuits such as central processing unit (CPU) cores and a graphics processing unit (GPU) with peripheral controllers and memory interfaces on single integrated circuit chip and is well-suited for portable, battery-powered operation. For example, an SOC could incorporate a display controller, an image signal processor (ISP), and other peripheral controllers on the SOC to enable the input and output of information to and from the computer system. In such large and complex SOCs, the devices typically transfer data between resources such as memory by routing accesses through a large, on-chip routing circuit or "data fabric".

The diversity of the circuits on a typical SOC presents problems for implementing power-saving modes. Operational and power saving modes are employed for many parts of a computer system, where the different modes provide different operating capacities such as processing power for a processor core, or signaling data rate for a communication bus or different levels of power savings when not in use. Both operating modes and non-operational, power-saving modes are referred to herein as "power states". One popular standard for managing such power modes is the Advanced Configuration and Power Interface (ACPI), which is a power management and configuration model for computers such personal computers (PCs) and servers. ACPI allows the computer operating system to control the amount of power each device consumes by changing the devices operating mode from among a limited set of modes. For example, such changes may include changing devices' clock speeds to a higher or lower frequency, or putting devices into standby or power-off modes. While ACPI is an industry standard which provides a generalized set of controls exposed to the operating system, it does not include specific features aimed at optimizing the power consumption or performance of specific data processing systems.

Figure 1:
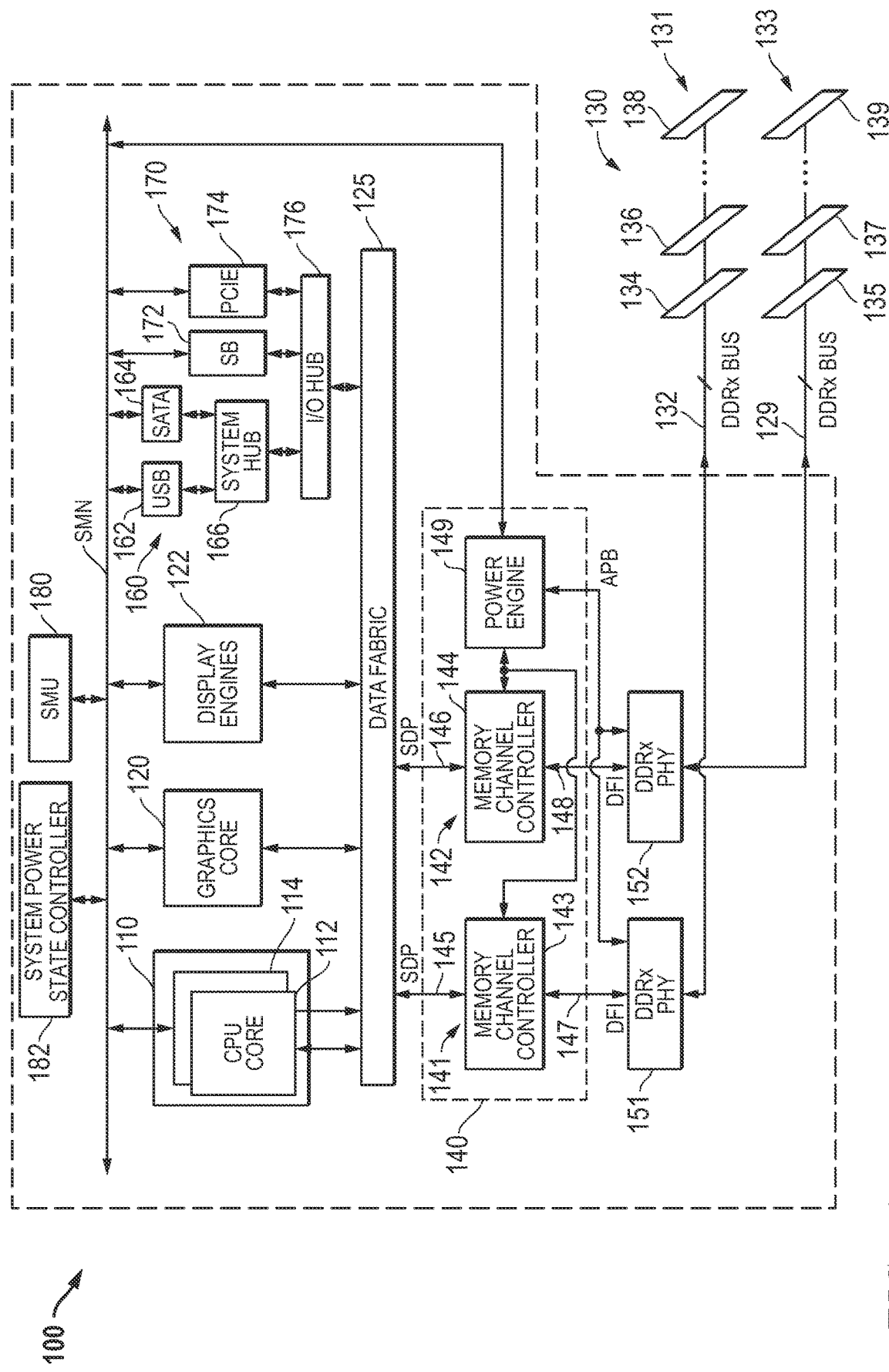
FIG. 1 illustrates in block diagram form an accelerated processing unit (APU) and memory system known according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An integrated circuit includes a power state controller and a first circuit. The first circuit includes a timer receiving an adjustable clock signal, and has a non-operational power state in which the adjustable clock signal is lost. Responsive to leaving the non-operational power state to enter a power state in which the adjustable clock has a lower frequency than the reference clock, the first circuit adjusts the frequency of the adjustable clock to a frequency higher than the lower frequency, and then receives an adjusted timer value associated with the non-operational power state, and starts the timer using an adjusted timer value.

A method includes causing a first circuit to enter a non-operational power state in which an adjustable clock signal for the first circuit is gated or powered down. The method includes causing the first circuit to leave the non-operational power state and restoring the timer with an adjusted timer value. Upon the first circuit leaving the non-operational power state to enter a power state in which the adjustable clock has a lower frequency than the reference clock, the method first adjusts the adjustable clock to a frequency higher than the lower frequency and then receives an elapsed time value associated with the non-operational power state.

A data processing system includes a plurality of processor cores, a first circuit coupled to the plurality of processor cores, and a power state controller. The first circuit includes a timer receiving an adjustable clock signal, and has a non-operational power state in which the adjustable clock signal is lost. Responsive to leaving the non-operational power state to enter a power state in which the adjustable clock has a lower frequency than the reference clock, the first circuit adjusts the frequency of the adjustable clock to a frequency higher than the lower frequency, and then receives the elapsed time value associated with the non-operational power state, and starts the timer using an adjusted timer value.

FIG. 1 illustrates in block diagram form an accelerated processing unit (APU) 100 and memory system 130 according to some embodiments. APU 100 is an integrated circuit suitable for use as a processor in a host data processing system, and includes generally a central processing unit (CPU) core complex 110, a graphics core 120, a set of display engines 122, a data fabric 125, a memory management hub 140, a set of peripheral controllers 160, a set of peripheral bus controllers 170, a system management unit (SMU) 180 and a system power state controller 182.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 through data fabric 125 for uniform translation into appropriate addresses in memory system 130.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages ACPI power states for the various processors and other functional blocks, and may receive measured power consumption values from CPU cores 112 and 114 and graphics core 120 to determine appropriate power states.

System power state controller 182 is bidirectionally connected to the SMN for communicating with local power state controllers in various parts of APU 200 to control power states of peripheral circuits in APU 200 independently of ACPI power states controlled by SMU 180. The power states controlled by system power state controller 182 differ from the various ACPI processor states and performance states, as defined in the ACPI specifications, in that they are additional power states which are typically not exposed to the operating system or controllable under the ACPI specification through its Operating System-directed configuration and Power Management (OSPM) system. Power states controlled by local power state controller 270 include idle states and "deep idle" states (which include powering down designated circuit blocks) that are coordinated with power states of other blocks in APU 100 by system power state controller 182, as further described below.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification for configuring PHY 151. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over advanced peripheral bus (APB) interface 254, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

The various processor cores, controllers, and interfaces of may include an interrupt controller such as an Advanced Programmable Interrupt Controller (APIC). APIC is a family of interrupt controllers which may be used in multiprocessor systems. It is one of several architectural designs intended to solve interrupt routing efficiency issues in multiprocessor computer systems. The APIC is a split architecture design, with a local component APIC (LAPIC) usually integrated into the processor itself, and an optional I/O APIC on a system bus.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
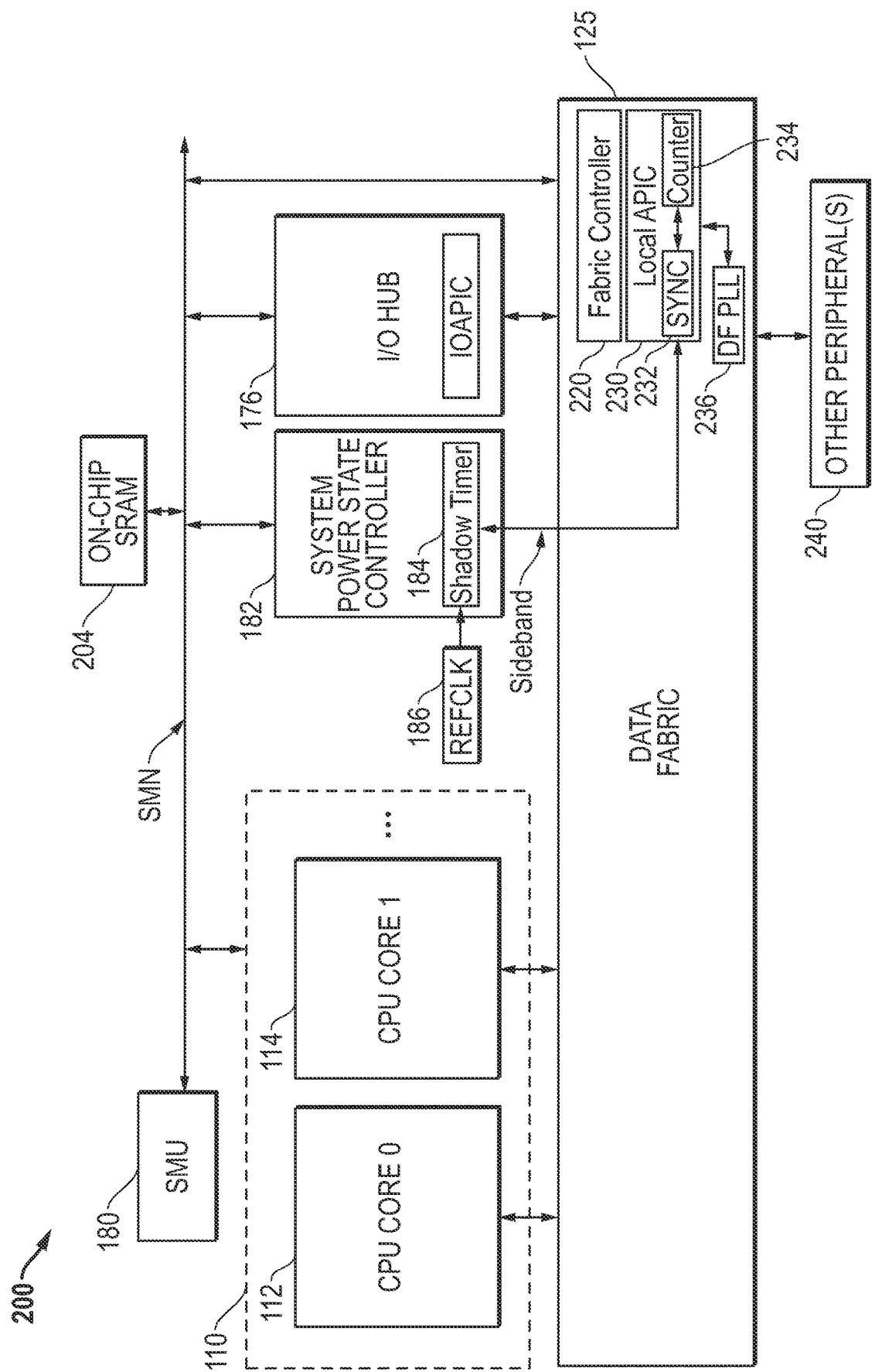
FIG. 2 illustrates in block diagram form a portion of an APU showing elements for managing power states transitions for circuits having timers according to an exemplary embodiment.

FIG. 2 illustrates in block diagram form a portion of an APU 200 showing elements for managing power states transitions for circuits having timers according to an exemplary embodiment. The depicted portion of APU 200 includes central processing unit (CPU) core complex 110, data fabric 125, SMU 180, the SMN, system power state controller 182, I/O hub 176, memory channel controller 144, and a block to indicate other peripherals 240 that also include timers suitable for use with the timer synchronization techniques described herein.

CPU cores 112 and 114 are each bidirectionally connected to data fabric 125. CPU core complex 110 is also bidirectionally connected to the SMN, typically at the individual core level. As indicated by the ellipsis, CPU core complex 110 typically includes more than two cores. Other types of processor cores such as GPU cores and artificial intelligence or neural network processing cores are also employed in some embodiments. In some embodiments, processor cores include timers such as APIC timers which are suitable for use with the timer synchronization techniques herein.

System power state controller 182 is bidirectionally connected to the SMN for communicating with local power state controllers in various parts of APU 200 to control power states of peripheral circuits in APU 200 independently of ACPI power states controlled by SMU 180. At least some of these power state transitions are transparent to the operating system, and have a low exit latency such that they can be employed frequently based on the system workload to save power without causing a large impact on system performance. For example, two non-operational power states controlled by system power state controller 182 have exit latencies of 350 μs and 1 ms respectively, allowing them to be used at a much higher frequency than ACPI power states (which typically have higher exit latencies) or other power states with higher exit latencies. System power state controller 182 may also include direct, sideband connections to specific circuits such as the local APIC timers. While only specific system peripherals are shown in FIG. 2, various other system blocks also include local power state controllers configured to control entry and exit from power states, including saving and restoring configuration and state data for their respective system blocks in response to commands from system power state controller 182. System power state controller 182 provides two ways of saving and restoring configuration and state data, by saving to system DRAM or by saving to on-chip SRAM 204.

On-chip SRAM 204 has a bidirectional connection to the SMN for receiving configuration and state data from various circuits in APU 200 to be stored during low power states. While an SRAM is employed in this embodiment, any suitable form of RAM that operates with a speed on the order of SRAM speeds may be employed to save the configuration and state data.

Reference clock 186 ("REFCLK") provides a clock signal to system power state controller 182, and continues operating during designated non-operational power states. Preferably, REFCLK 186 is a crystal oscillator, non-spread spectrum clock circuit which provides a clock signal of a relatively high frequency compared to the time stamp counter (TSC) clock typically employed for coarse timing of system events. This clock signal is used as a basis to generate the base timer rate for APU 200's APIC timers. The base timer rate can further be altered, typically by dividing down, in each particular peripheral component depending on the operational power state of the peripheral component. While APIC timers are described in this embodiment, other types of timers are used in other embodiments. While the term APIC generally refers to a peripheral controller including timers, an APIC timer may be employed in various embodiments without a full APIC peripheral controller, and include only a subset of features related to the APIC timer.

Data fabric 125 includes a fabric controller 220, a local APIC timer 230, and a data fabric phase-locked loop ("DF PLL") 236. Other portions of data fabric 125 such as the ports and the crossbar router are not shown in order to focus on the relevant features, however the data fabric generally includes multiple master ports for generating memory access requests on behalf of requestors connected to data fabric 125, multiple slave ports for fulfilling such requests from memory devices connected to the data fabric 125, and a crossbar router forming virtual connections between the master and slave ports based on the destination address of the requests. Fabric controller 220 is bidirectionally connected to the SMN and connected to various control circuitry for controlling and configuring the data fabric, including local APIC timer 230 and DF PLL 236. Local APIC timer 230 includes a counter 234 and a cross-domain synchronization circuit 232 ("SYNC"). Counter 234 is connected to DF PLL 236 and uses the DF PLL as a clock source based on which the counter operates. DF PLL 236 is an adjustable PLL supplying an adjustable clock signal at least to local APIC timer 230, and preferably supplies a clock signal to all of data fabric 125. Cross-domain synchronization circuit 232 is connected to shadow timer 184 of system power state controller 182 and to counter 234. Cross domain synchronization circuit 232 is preferably constructed as a synchronizer including multiple sync flip-flops for preventing metastable states from occurring across clock domains, and control logic operable to cause the circuit to sync with system power state controller 182 during certain clock synchronization processes as further described below.

Fabric controller 220 operates in response to commands from system power state controller 182 to place data fabric 125 in selected operational power states and non-operational power states. In some embodiments, fabric controller 220 monitors traffic on data fabric 125 and places data fabric 125 in a selected power state, such as a light idle state, based on detecting conditions in which data fabric 125 may be idled. For example, conditions under which certain ports are disconnected while other ports are allowed to "stutter" traffic by allowing it to build up in a buffer allow for a light idle state in some embodiments. In some designated non-operational power states, the signal of DF PLL 236 is lost, either because it is gated or the PLL is powered down. In some designated non-operational power states, the entire peripheral circuit or intellectual property (IP) block such as the fabric controller is powered down. APIC timer 230 is able to be backed up, tracked, and restored with an adjusted timer value during transitions to and from non-operational power states directed by system power state controller 182. In these transitions, system power state controller 182 stores a timer value from APIC timer 230 in a memory such as on-chip SRAM 204, starts shadow timer 184 to measure a time associated with the designated non-operational power state, and restores APIC timer 320 with an adjusted timer value following the designated non-operational power state. The operational power states include states in which the frequency of DF PLL 236 is equal to or higher than REFCLK 186, and the clock signal edges of DF PLL 236 are synchronized with the clock edges of REFCLK. Such states may be referred to as "low error" states because the error in saving and restoring the timer values of local APIC timer 230 is low. Other power states also include includes operational power states and idle power states in which the frequency of DF PLL 236 is lower than REFCLK 186. While the DF PLL 236 frequency in some of these states provides sufficient granularity for timer accuracy, these power states are referred to herein as "high error" power states because a potentially high accumulated error of unknown size can result when saving and restoring the timer value from these states. Such error is due to the slower clock signal of DF PLL 236 and its unsynchronized relationship with the clock signal edges of REFCLK 186. Importantly, such errors are incremental such that they can build up over time and eventually cause unpredictable operational problems depending on the specific use of the timer. The more frequently the non-operational power state is used, the larger such incremental errors become. In this embodiment, the depicted local APIC timer 230 and shadow timer 184 are used with a process to mitigate the incremental errors.

I/O Hub 176 and other peripheral circuits 240, such as memory controllers, graphical processing units (GPUs), and deep-learning processing units (DLPs) may also include timers constructed similarly to local APIC timer 230 including a cross-domain synchronization circuit 232. The timer tracking and adjustment process herein may be used with any suitable timer which is part of a circuit having non-operational power states in which the timer's power or clock signal is lost.

Figure 3:
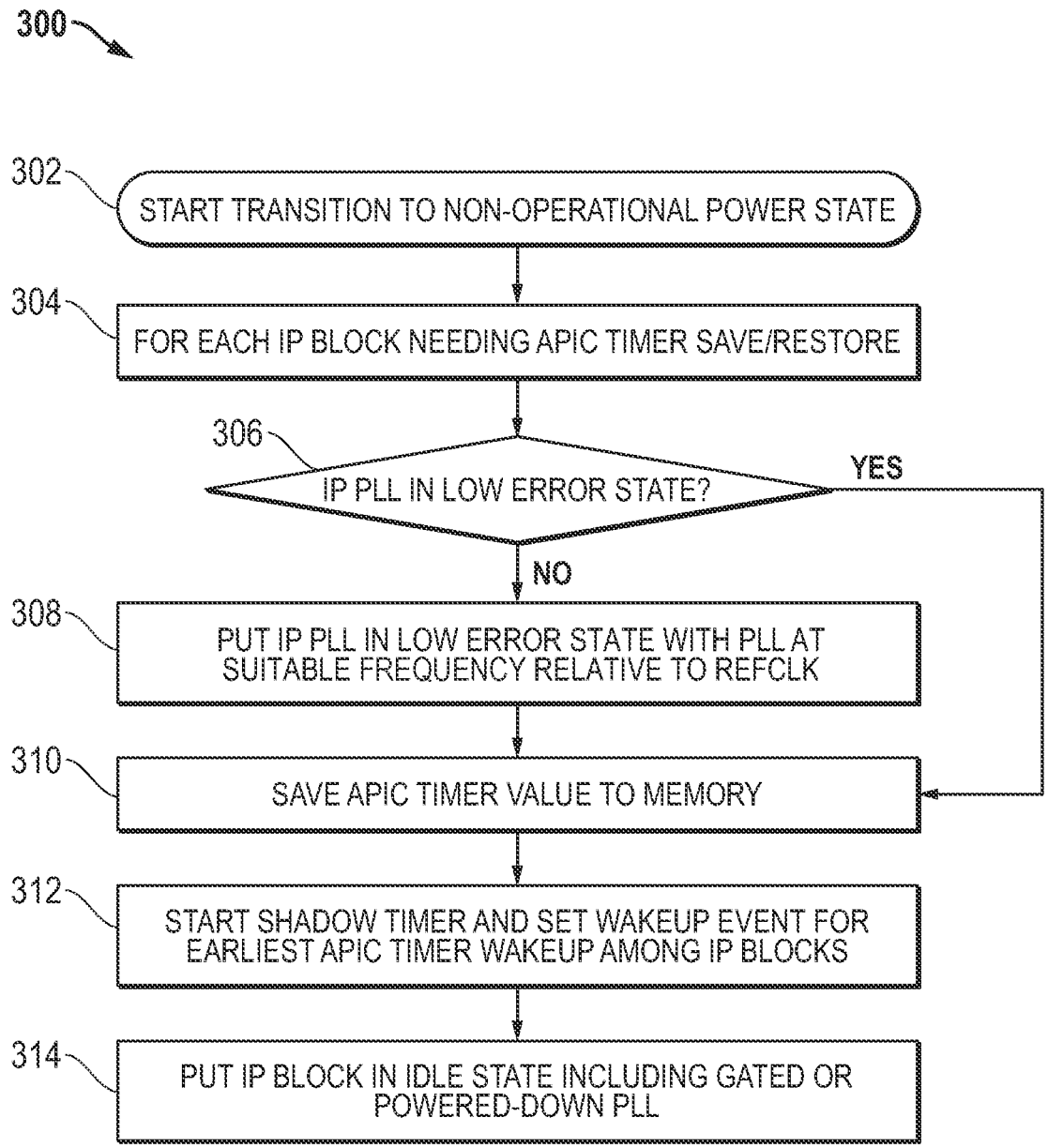
FIG. 3 shows a flowchart of a process for transitioning to a non-operational power state according to some embodiments.

FIG. 3 shows a flowchart 300 of a process for transitioning to a non-operational power state according to some embodiments. The process is suitable for use with APU 100 and APU 200 above, or another suitable integrated circuit including peripheral circuits with timers, and is performed under control of system power state controller 182 and local power state controllers for the IP blocks in question, such as fabric controller 220. The process is initiated by system power state controller at block 302, where it starts the transition to a non-operational power state, typically in response to detecting conditions that allow for an idle state or non-operational power state to be entered for a circuit or intellectual property (IP) block within APU 200. Generally, the entire IP block concerned, such as data fabric 125, is placed in the non-operational power state. However, in some embodiments the "circuit" may refer to only a portion of the IP block.

As shown at block 304, for each IP block that needs timer save and restore sequences, the process performs blocks 306, 308, 310, 312, and 314. Various other steps (not shown) such as saving state date and purging buffers are included, depending on the particular IP block involved.

At block 306, the process determines if the IP block's PLL is already in a low error state in which the PLL is operating at the REFCLK frequency or another a suitable frequency such that synchronization with REFCLK 186 can be performed with low error. For example, if the particular IP block is in low power state such as a light idle state with a reduced clock frequency relative to that of REFCLK 186, such a reduced frequency is considered a high error state at block 310. For low error states, the process goes to block 310. For high error states, the process goes to block 308 where it places the IP block's PLL in the low error state by adjusting the circuits PLL frequency. From block 308, the process goes to block 310.

At block 310, the process receives a timer value from the circuit under transition at system power state controller 182, and stores the timer value in a memory. An on chip memory such as SRAM memory 204 (FIG. 2) is used in some embodiments, or a local memory within system power state controller 182 can also be used.

Next at block 312, the process starts shadow timer 184 operating on the REFCLK signal to measure a time associated with the designated non-operational power state. At block 312, the process also starts a wakeup timer for the earliest wakeup time required among the IP blocks being transitioned to a non-operational power state. This wakeup time is adjusted to account for the wakeup latency. Next at block 314, the process causes the IP block for which a circuit is being transitioned to enter a non-operational power state in which the circuit's PLL or adjustable clock is gated or powered down.

The process of FIG. 3 is used for each IP block entering a non-operational power state and having a timer configured to be backed up and restored. Generally, timers with which the process is suitable for use include all APIC timers or other similar timers in IP blocks that are being transitioned to a non-operational power state. As depicted by the Sideband connection (FIG. 2), the timer backup process is preferably conducted through dedicated sideband signaling for each IP block, rather than over the SMN, in order to achieve predictable latency in both saving and restoring the timer values.

Figure 4:
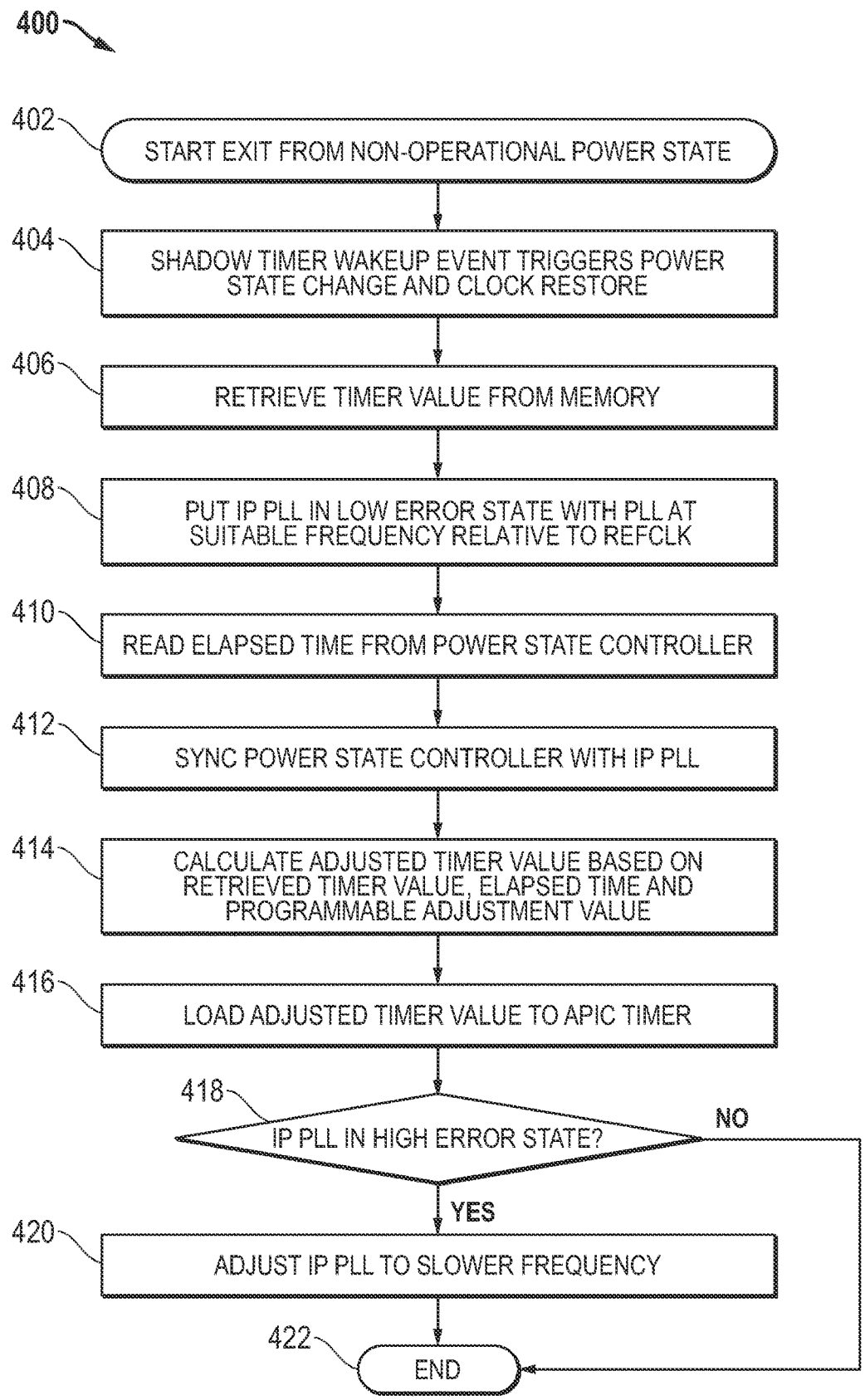
FIG. 4 shows a flowchart of a process for transitioning out of a non-operational power state according to some embodiments.

FIG. 4 shows a flowchart 400 of a process for transitioning out of a non-operational power state according to some embodiments. The process is suitable for use with APU 200 and other system designs that employ the transition process of FIG. 3 or use an adjustable clock with a local timer that can benefit from a more precise backup and restore process.

At block 402, the process starts an exit from a non-operational power state for a circuit of an IP block for which at least one timer value has been saved and shadowed with shadow timer 184. As shown at block 404, the exit process typically initiates with a timer wakeup event on shadow timer 184, which triggers the power state change and clock restore. However, other triggering events such as system power state controller 182 detecting a condition that requires exiting the low power state may also trigger the power state change and clock restore.

Responsive to the trigger at block 404, at block 406 system power state controller 182 retrieves the timer value for the timer being restored from memory. System power state controller 182 may also initiate other power state transition circuitry in the IP block being restored, in parallel with the depicted process. For example, depending on the particular circuit that is exiting a non-operational power state, other circuitry is powered up, initialized, and loaded with state data such as the contents of queues and registers.

At block 408, the process puts the circuit's PLL, or other adjustable clock for the first circuit being restored, into the low error state in which the clock can be synched precisely with the REFCLK signal. Then the elapsed time indicating the time tracked by the shadow timer is read from the power state controller at block 410.

At block 412 the process includes syncing the first circuit with the power state controller using a cross-domain synchronization circuit. Block 412 can occur concurrently or out of order with block 410 in some embodiments. Preferably, syncing the first circuit with system power state controller 182 includes sending a timer read signal to system power state controller 182 through cross-domain synchronization circuit 232, and receiving an acknowledgement signal from system power state controller 182 through cross-domain synchronization circuit 232.

At block 414, the process calculates the adjusted timer value based on the elapsed time is calculated using several factors including a synchronization time for the cross-domain synchronization circuit, a first error value associated with the latency of receiving the timer value, and a second error value associated with the latency of restoring the timer's value. The first and second error values are preferably estimated and combined to form a single adjustment which is a configuration value employed at the first circuit in calculating the adjusted timer value. With such a design, each IP block can calculate its own adjusted timer value. While in this embodiment the adjusted timer value is calculated at the IP block based on the based on the retrieved timer value, the elapsed time, and the other adjustments discussed above, the particular location at which the adjusted timer value is calculated is may vary. In some embodiments, the adjusted timer value is calculated at system power state controller 182.

At block 416, the adjusted timer value is loaded to the timer and the timer is initialized in order to restore the timer to a value that includes the period of shadow timing during the non-operational power state. Preferably this step is done immediately following the sync at block 412 such that the delay associated with loading the timer is predictable.

At block 418, the process determines if the circuit is leaving the non-operational power state to enter an operational power state in which the adjustable clock has a lower frequency than the reference clock. If so, the process goes to block 420 where it adjusts the PLL or adjustable clock to the desired lower frequency at which the circuit is driven in the high error state. For example, if the circuit is leaving the non-operational power state to enter a light idle state or a low power operational power state with a lower clock frequency than REFCLK, blocks 408 to 420 first adjust the adjustable clock to a frequency higher than the target lower frequency and receive the adjusted timer value, then adjust the adjustable clock to the lower frequency. This technique increases the precision and accuracy of the timer shadowing process. Then the process ends at block 422. If the circuit is not going to the high error state at block 418, for example if the non-operational power state is being exited to enter an operational power state in which the PLL is at a frequency for a low error state, the process goes from block 418 to block 42241.

Figure 5:
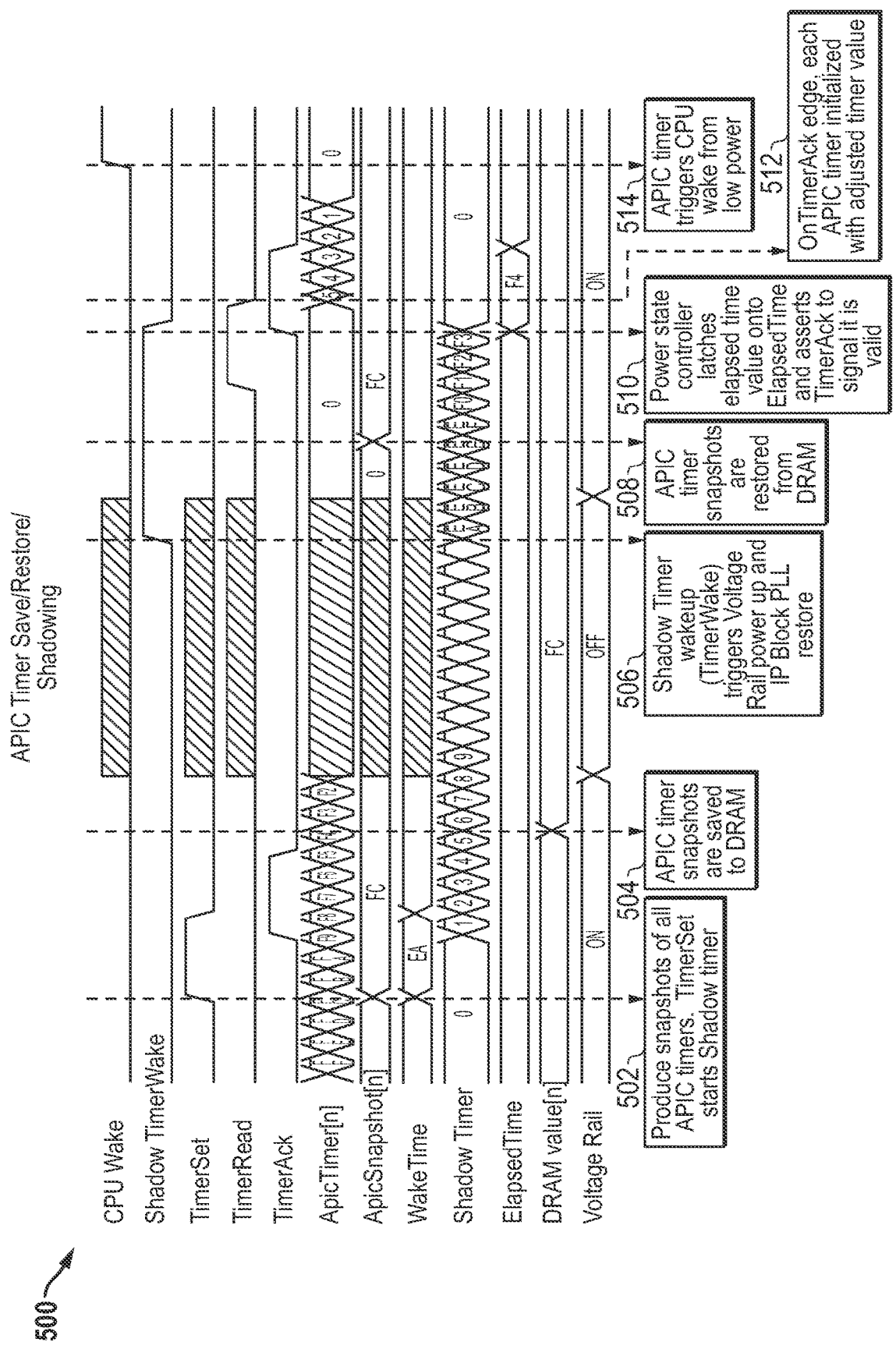
FIG. 5 shows a timing diagram including signals involved in backup up and restoring timer values for a non-operational power state according to some embodiments.

FIG. 5 shows a timing diagram 500 including signals involved in backup up and restoring timer values for a non-operational power state according to some embodiments. Diagram 500 shows a "CPU Wake" signal, a "Shadow TimerWake" signal, a "TimerSet" signal, a "TimerRead" signal, a "TimerAck" signal, an "APICTimer[n]" signal, an "ApicSnapshot[n]" signal, a "WakeTime" signal, a "Shadow Timer" value, an "ElapsedTime" signal, a "DRAM value[n]" signal, and a "Voltage Rail" supply voltage. The non-operational power state depicted in diagram 500 is entered when the host system such as APU 200 is in a power state such as the ACPI "PC6" (package C6) idle state. In prior art systems, the PC6 idle state would not allow the APIC timers to be powered down because the exit from PC6 is triggered by an APIC timer. Using the techniques herein, improved exit latencies allow for more power saving by placing selected IP blocks in the non-operational power state during PC6, and exiting it at the appropriate time for the system to exit the PC6 state.

At block 502, upon determining that one or more IP blocks including timers shall enter the non-operational power state, system power state controller 182 causes a snapshot timer value of each of a number "n" of APIC timers to be stored to a memory, as shown by the ApicSnapshot[n] signal having a value "FC" being stored to a memory location shown as DRAM value[n] at block 504. System power state controller 182 also subtracts a programmable wakeup time offset from the earliest wakeup time of all the APIC timers, in order to account for power up latency. This wakeup time value, labeled "EA" on the WakeTime signal, provides the wakeup time for shadow timer 184. Also at this point, as shown at block 502, the TimerSet signal starts shadow timer 184.

Then, Voltage Rail is changed from the ON state to the OFF state, causing the voltage supply for the IP blocks concerned to be turned off. (Additional signaling is required for each IP block concerned to enter the non-operational power state, but such signaling is not depicted here in order to focus on the timer backup process.) At this point, the IP blocks are in the non-operational power state, as indicated by the shaded areas on the diagram associated with signals of the IP block, while shadow timer 184 runs.

At block 506, the value of shadow timer 184 reaches the wakeup setting as shown on the clock cycle labeled "EA" on the Shadow Timer signal. In response, the voltage supply Voltage Rail is changed from the OFF state to the ON state, powering up the IP blocks that were powered down in the non-operational power state and restoring their PLLs.

Then at block 508, the APIC timer snapshots are restored from memory. Upon reaching a suitable point in the initialization process, with the IP block PLL at the frequency for the low error state, each IP block asserts the TimerRead signal through its cross-domain synchronization circuit 232. An elapsed time value is provided by the Shadow Timer to measure the time elapsed while the IP block's timer is not operating. As shown at block 510, system power state controller 182 latches the elapsed time depicted by the label "F4" onto the ElapsedTime signal connection to counter 234, and asserts the TimerAck signal through cross-domain synchronization circuit 232 to indicate that the Elapsed time signal is valid.

Next, at block 512, on the edge of the TimerAck signal, each APIC timer is initialized with the adjusted timer value. Then, the APIC timer with the earliest wakeup time setting reaches its wakeup timer value and triggers the CPU Wake signal as shown at block 514. In this example, the CPU Wake signal goes to SMU 180 in order to initiate an exit from a CPU low power state such as a PC6 idle power state. However, other types of events are initiated by an IP block's timer wakeup in other embodiments.

While this particular signaling and timing arrangement is depicted as an example, many other signaling and timing arrangement may be employed to implement the timer backup and restore capability and processes described herein.

APU 200 of FIG. 2 or any portions thereof, such as system power state controller 182 and data fabric 125, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while APIC timers are described, various types of timers are backed up and restored in various embodiments. Any of the IP blocks depicted in FIG. 1 may support power states as described herein for which a local timer is backed up and restored. Accordingly, it is intended by the appended claims to cover all modifications of the disclosed embodiments that fall within the scope of the disclosed embodiments.

What is claimed is:

1. An integrated circuit, comprising:
    a first circuit including a timer receiving an adjustable clock signal, the first circuit having a non-operational power state in which the adjustable clock signal is lost,
    wherein, responsive to leaving the non-operational power state to enter a power state in which the adjustable clock signal has a lower frequency than a reference clock signal, the first circuit adjusts the frequency of the adjustable clock signal to a frequency higher than the lower frequency, and then receives an elapsed time value associated with the non-operational power state and starts the timer using an adjusted timer value.

2. The integrated circuit of claim 1, further comprising a power state controller including a shadow timer receiving the reference clock signal, wherein the power state controller stores a timer value from the timer in a memory, starts the shadow timer to measure an elapsed time value associated with the non-operational power state, and restores the timer with the adjusted timer value following the non-operational power state.

3. The integrated circuit of claim 1, further comprising a power state controller including a shadow timer receiving the reference clock signal, wherein the power state controller stores a timer value from the timer in a memory, starts the shadow timer to measure the elapsed time value associated with the non-operational power state, and restores the timer with the adjusted timer value following the non-operational power state.

4. The integrated circuit of claim 3, wherein: the first circuit includes a cross-domain synchronization circuit operable to sync with the power state controller before receiving the elapsed time value, and the first circuit is operable to, when syncing with the power state controller, send a timer read signal to the power state controller through the cross-domain synchronization circuit and receive an acknowledgement signal from the power state controller through the cross-domain synchronization circuit.

5. The integrated circuit of claim 4, wherein first circuit calculates the adjusted timer value based on the timer value stored in the memory, the shadow timer, a synchronization time for the cross-domain synchronization circuit, a first error value associated with receiving the timer value, and a second error value associated with restoring the timer.

6. The integrated circuit of claim 1, wherein the power state in which the adjustable clock signal has a lower frequency than the reference clock signal is a light idle state in which the adjustable clock signal is supplied to the timer but gated from at least some of the first circuit.

7. The integrated circuit of claim 3, further comprising:
    a second circuit including a second timer receiving a second adjustable clock signal, the second circuit having a non-operational power state in which the second adjustable clock signal is lost, and a plurality of power states in which the second adjustable clock signal operates at different respective frequencies,
    wherein the power state controller is operable to command the second circuit to enter the non-operational power state, store a timer value from the second timer in a memory, and set a timer wakeup value for the shadow timer based on an earliest wakeup time and a non-operational power state exit latency value both selected from among the timer and the second timer.

8. A method, comprising: causing a first circuit to enter a non-operational power state in which an adjustable clock signal for the first circuit is gated or powered down; causing the first circuit to leave the non-operational power state and restoring a timer with an adjusted timer value; and upon the first circuit leaving the non-operational power state to enter a power state in which the adjustable clock signal has a lower frequency than a reference clock signal, first adjusting the adjustable clock signal to a frequency higher than the lower frequency and then receiving an elapsed time value associated with the non-operational power state.

9. The method of claim 8, wherein the power state in which the adjustable clock signal has a lower frequency than the reference clock is a light idle state in which the adjustable clock signal is supplied to the timer but gated from at least a portion of the first circuit.

10. The method of claim 8, further comprising at a power state controller, receiving a timer value from the first circuit, storing the timer value in a memory, and starting a shadow timer operating on a reference clock signal to measure the elapsed time value associated with the non-operational power state.

11. The method of claim 10, further comprising:
    syncing the first circuit with the power state controller using a cross-domain synchronization circuit before receiving the elapsed time value; and
    when syncing the first circuit with the power state controller, sending a timer read signal to the power state controller through the cross-domain synchronization circuit and receiving and acknowledgement signal from the power state controller through the cross-domain synchronization circuit.

12. The method of claim 8, further comprising, upon the first circuit leaving a power state in which the adjustable clock signal has a lower frequency than the reference clock signal, first adjusting the frequency of the adjustable clock signal to the frequency higher than the lower frequency and then transmitting the timer value to thea power state controller.

13. A data processing system, comprising:
a plurality of processor cores; and
a first circuit coupled to the plurality of processor cores and including a timer receiving an adjustable clock signal, the first circuit having a non-operational power state in which the adjustable clock signal is lost,
wherein, responsive to leaving the non-operational power state to enter a power state in which the adjustable clock signal has a lower frequency than a reference clock signal, the first circuit is operable to adjust the frequency of the adjustable clock signal to a frequency higher than the lower frequency, and then receive an elapsed time value and start the timer using an adjusted timer value.

14. The data processing system of claim 13, wherein the power state in which the adjustable clock signal has a lower frequency than the reference clock signal is a light idle state in which the adjustable clock signal is supplied to the timer but gated from at least a portion of the first circuit.

15. The data processing system of claim 14, wherein:
the first circuit includes a cross-domain synchronization circuit operable to sync with the power state controller before receiving the elapsed time value, and
the first circuit is operable to, when syncing with the power state controller, send a timer read signal to the power state controller through the cross-domain synchronization circuit and receive an acknowledgement signal from the power state controller through the cross-domain synchronization circuit.

16. The data processing system of claim 15, wherein first circuit calculates the adjusted timer value based on the timer value stored in the memory, the elapsed time value, a synchronization time for the cross-domain synchronization circuit, a first error value associated with receiving the timer value, and a second error value associated with restoring the timer.

17. The data processing system of claim 13, further comprising a power state controller including a shadow timer receiving the reference clock signal, wherein the power state controller stores a timer value from the timer in a memory, starts the shadow timer to measure an elapsed time value associated with the non-operational power state, and restores the timer with the adjusted timer value following the non-operational power state.

18. The data processing system of claim 17, wherein the first circuit is operable to, upon leaving a power state in which the adjustable clock signal has a lower frequency than the reference clock signal, first adjust the frequency of the adjustable clock signal to the frequency higher than the lower frequency and then transmit the timer value to the power state controller.

19. The data processing system of claim 17, further comprising:
a second circuit including a second timer receiving a second adjustable clock signal, the second circuit having a non-operational power state in which the second adjustable clock signal is lost, and a plurality of power states in which the second adjustable clock signal operates at different respective frequencies,
wherein the power state controller is operable to, upon the second circuit entering the non-operational power state, store a timer value from the second timer in a memory, and set a timer wakeup value for the shadow timer based on an earliest wakeup time and a non-operational power state exit latency value both selected from among the timer and the second timer.

20. The data processing system of claim 19, wherein the first circuit is a data fabric, and the second circuit is one of a memory controller, and input/output controller, and a processor core.

* * * * *